(12) United States Patent
Britsch (10) Patent No.: US 11,365,745 B2
(45) Date of Patent: Jun. 21, 2022

(54) PUMP CASING WITH INTEGRAL SUPPORT FLANGE

(71) Applicant: CIRCOR PUMPS NORTH AMERICA, LLC., Monroe, NC (US)

(72) Inventor: Manfred Britsch, Radolfzell (DE)

(73) Assignee: CIRCOR PUMPS NORTH AMERICA, LLC., Monroe, NC (US)

( * ) Notice: Subject to any disclaimer, the term of this patent is extended or adjusted under 35 U.S.C. 154(b) by 164 days.

(21) Appl. No.: 16/633,224

(22) PCT Filed: Jul. 23, 2018

(86) PCT No.: PCT/US2018/043230
§ 371 (c)(1),
(2) Date: Jan. 23, 2020

(87) PCT Pub. No.: WO2019/023095
PCT Pub. Date: Jan. 31, 2019

(65) Prior Publication Data
US 2020/0182256 A1    Jun. 11, 2020

(30) Foreign Application Priority Data
Jul. 25, 2017   (EP) .................................... 17183027

(51) Int. Cl.
*F04D 29/40* (2006.01)
*F04D 29/60* (2006.01)
(Continued)

(52) U.S. Cl.
CPC ........... *F04D 29/167* (2013.01); *F04D 29/00* (2013.01); *F04D 29/40* (2013.01);
(Continued)

(58) Field of Classification Search
CPC ........ F04D 29/60; F04D 29/62; F04D 29/628; F04D 29/00; F04D 29/40; F16L 23/00;
(Continued)

(56) References Cited

U.S. PATENT DOCUMENTS

| 3,022,740 A | 2/1962 | Wilfley |
| 3,738,782 A | 6/1973 | Fraser |

(Continued)

FOREIGN PATENT DOCUMENTS

| CN | 101210575 A | 7/2008 |
| CN | 202531486 U | 11/2012 |

(Continued)

OTHER PUBLICATIONS

International Search report dated Oct. 11, 2018 for PCT/US2018/043230, filed Jul. 23, 2018, 3 pages.

(Continued)

*Primary Examiner* — Courtney D Heinle
*Assistant Examiner* — Andrew J Marien
(74) *Attorney, Agent, or Firm* — KDB Firm PLLC (57) ABSTRACT

A grey water treatment system includes a first tank configured to receive grey water via a grey water supply conduit and that comprises an overflow, a second tank configured to store grey water, and at least one transfer conduit configured to at least transfer grey water between the first tank and the second tank. A control is configured to maintain a water level in said first tank sufficiently close to the overflow to allow floating contaminants to pass over the overflow. A method of treating grey water includes: receiving grey water in a first tank of a grey water treatment system; transferring grey water via at least one transfer conduit between the first tank and a second tank of said treatment system; and controlling a water level in said first tank sufficiently close (Continued)

to an overflow of said first tank to allow floating contaminants to pass over the overflow.

17 Claims, 8 Drawing Sheets (51) Int. Cl.
  F04D 29/16       (2006.01)
  F04D 29/42       (2006.01)
  F04D 29/62       (2006.01)
  F16L 23/02       (2006.01)
  F16L 23/00       (2006.01)
  F16L 23/028      (2006.01)
  F04D 29/00       (2006.01)
  F16L 23/024      (2006.01)

(52) U.S. Cl.
  CPC ......... *F04D 29/4293* (2013.01); *F04D 29/60* (2013.01); *F04D 29/62* (2013.01); *F04D 29/628* (2013.01); *F16L 23/00* (2013.01); *F16L 23/02* (2013.01); *F16L 23/024* (2013.01); *F16L 23/028* (2013.01); *F16L 23/0283* (2013.01)

(58) Field of Classification Search
  CPC ....... F16L 23/02; F16L 23/024; F16L 23/028; F16L 23/0283
  See application file for complete search history.

(56) References Cited

U.S. PATENT DOCUMENTS

| 3,891,345 | A |  | 6/1975 | Doolin |  |
|---|---|---|---|---|---|
| 6,405,748 | B1 | * | 6/2002 | Muhs | F04D 7/045 137/351 |
| 2008/0317592 | A1 | * | 12/2008 | Adler | F04D 29/605 415/213.1 |
| 2010/0239419 | A1 | * | 9/2010 | Maier | F04D 27/0215 415/214.1 |
| 2011/0142599 | A1 | * | 6/2011 | Burgess | F04D 29/106 415/127 |
| 2013/0082464 | A1 | * | 4/2013 | Sodergard | F16L 23/00 285/405 |
| 2016/0131153 | A1 |  | 5/2016 | Koivikko et al. |  |
| 2016/0153469 | A1 |  | 6/2016 | Mikkelsen et al. |  |
| 2016/0305445 | A1 |  | 10/2016 | Sørensen |  |
| 2018/0363659 | A1 | * | 12/2018 | Mikkelsen | F04D 1/066 |

FOREIGN PATENT DOCUMENTS

| CN | 203476810 U | 3/2014 |
|---|---|---|
| CN | 204140438 U | 2/2015 |
| CN | 204511983 U | 7/2015 |
| JP | 2000297777 A | 10/2000 |

OTHER PUBLICATIONS

Written Opinion report dated Oct. 11, 2018 for PCT/US2018/043230, filed Jul. 23, 2018, 4 pages.
European Search report dated Jan. 19, 2018 for EP 17183027, filed Jul. 25, 2017, 5 pages.
European Search report dated Oct. 8, 2021 for EP 17183027.6, filed Jul. 25, 2017, 4 pages.

* cited by examiner

PUMP CASING WITH INTEGRAL SUPPORT FLANGE

This is a national stage application filed under 35 U.S.C. § 371 of pending international application PCT/US2018/043230, filed Jul. 23, 2018, which claims priority to European Patent application EP 17183027.6 filed Jul. 25, 2017, the entirety of which applications are hereby incorporated by reference herein.

FIELD OF THE DISCLOSURE

The present disclosure relates generally to pumps, and more particularly to a pump casing having an integral support flange for fixing the pump to adjacent structure.

BACKGROUND OF THE DISCLOSURE

Centrifugal pumps find use in a wide variety of fluid transfer applications. One common environment in which centrifugal pumps are employed is the marine industry, where they are used to transfer fluid between tanks, supply cooling water to various shipboard equipment, pump down bilge volumes, and the like.

Figure 1:
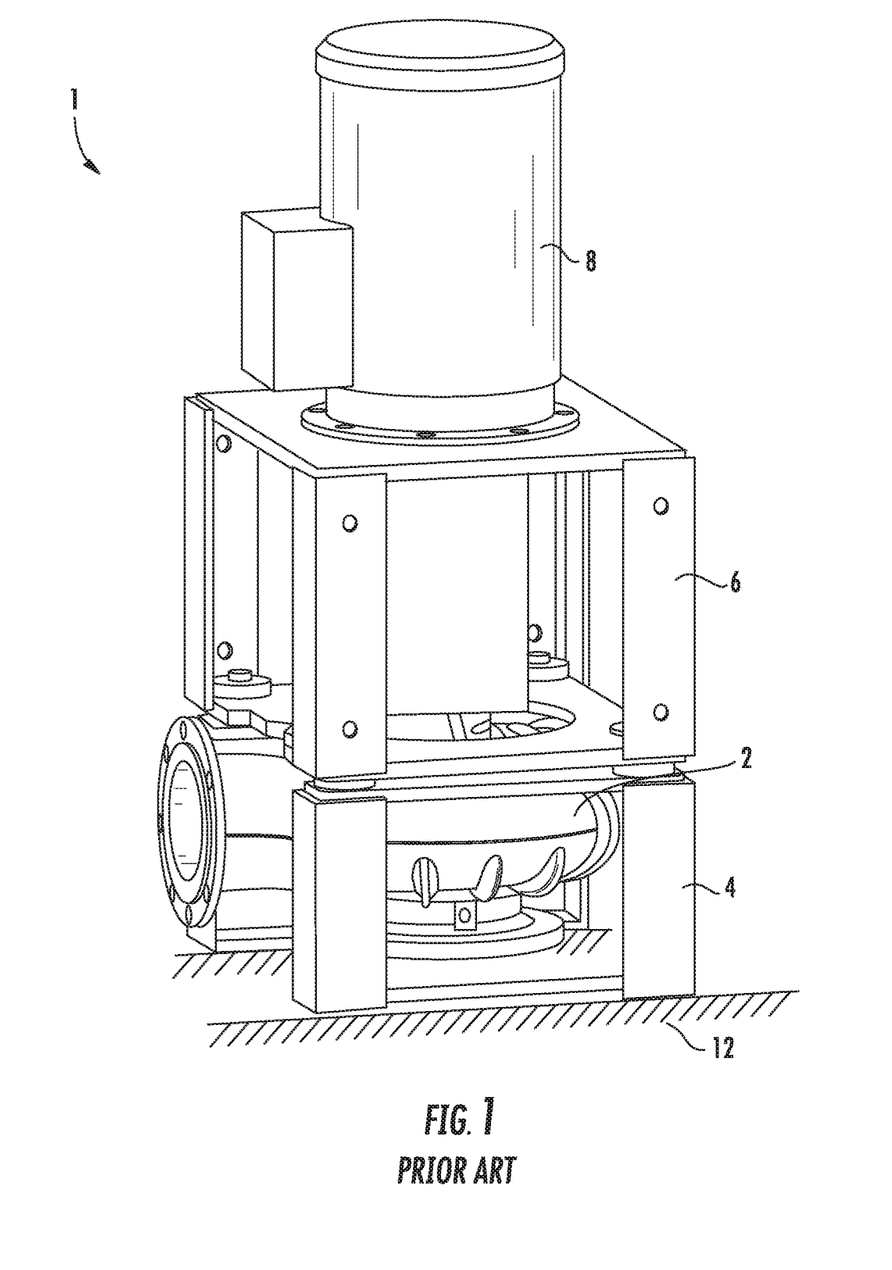
FIG. 1 is an isometric view of a centrifugal pump incorporating a known pump support arrangement.

Due to shipboard space limitations, such as typically exist in engine rooms, centrifugal pumps are often installed vertically (i.e., suction is taken from below, and the motor is mounted on top of the pump casing). Such a vertically arranged pump 1 is shown in FIG. 1. As will be appreciated, pumps and piping systems used in shipboard applications must be designed withstand forces encountered when the ship is at sea. Due to the large weight of the pump 1, it is not structurally adequate to support the pump using only the suction and discharge piping. To ensure that the pump 1 is stably supported in heavy sea conditions, and to ensure that the weight of the pump does not damage the associated suction and discharge piping, the pump 1 is often attached to the ship's foundation or other suitable structure using a bracket 4 or other structural member.

In the illustrated pump 1, to provide desired support, bracket 4 is bolted or otherwise fixed to the motor mount support 6 which provides support to the motor 8. The bracket 4 is, in turn, fixed to the ship's foundation 12. One problem with such an arrangement is that it requires additional parts to be fabricated and joined to the pump structure, which can increase production and installation time and cost. The addition of such a large bracket 5 also increases the overall height, weight and footprint of the pump 1.

In view of this, there is a need for an improved support arrangement for vertically oriented centrifugal pumps that addresses the aforementioned deficiencies in the current art.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a pump casing having an integral support flange for coupling the pump casing to a foundation to fix and support the pump during operation. The pump casing can include a casing portion for receiving an impeller therein, a suction flange portion for coupling the casing portion to suction piping of an associated piping system, and a support flange portion for coupling the pump casing to a foundation to fix and support the pump casing during operation. The support flange portion is integral to the suction flange portion.

In some embodiments, the suction flange portion and the support flange portion are cast along with the casing portion as a single piece. The suction flange can include a plurality of fastener openings to receive a plurality of fasteners for coupling the pump casing to a flange of the associated piping system. The support flange portion can include a plurality of fastener openings to receive a plurality of fasteners for fixing the pump casing to the foundation.

For some embodiments, the plurality of fastener openings in the support flange portion can be positioned radially outwardly of the plurality of fastener openings in the suction flange portion.

The support flange portion has, in some embodiments, a rectangular outer geometry. Respective ones of the plurality of fastener openings in the support flange portion can be positioned at respective corners of the rectangular support flange portion. The support flange portion can be located radially outward with respect to the suction flange portion. The support flange portion can comprise a radial extension of the suction flange portion.

The pump casing may include a plurality of stiffening ribs coupling an upper surface of the support flange portion to the casing portion. The plurality of stiffening ribs may also couple an upper surface of the suction flange to the casing portion. Respective ones of the plurality of stiffening ribs can, in some embodiments, be positioned directly adjacent to associated ones of the plurality of fastener openings in the support flange portion. The plurality of stiffening ribs can be positioned between adjacent ones of the plurality of fastener openings in the suction flange. The plurality of stiffening ribs can be positioned beneath respective motor mounting reinforcements on the pump casing.

In some embodiments, the support flange radially surrounds the suction flange, and the plurality of fastener openings in are evenly spaced about a perimeter of the support flange. A bottom surface of the support flange portion forms a plane that is offset from a plane formed by a seal-engaging surface of the suction flange.

BRIEF DESCRIPTION OF THE DRAWINGS

By way of example, specific embodiments of the disclosed device will now be described with reference to the accompanying drawings, in which.

DETAILED DESCRIPTION

A device in accordance with the present disclosure will now be described more fully hereinafter in combination with the accompanying drawings, in which embodiments of the device are shown. The disclosed device, however, may be embodied in many different forms and should not be construed as being limited to the embodiments set forth herein. Rather, these embodiments are provided so that this disclosure will be thorough and complete, and will fully convey the scope of the device to those skilled in the art. In the drawings, like numbers refer to like elements throughout.

Figure 2:
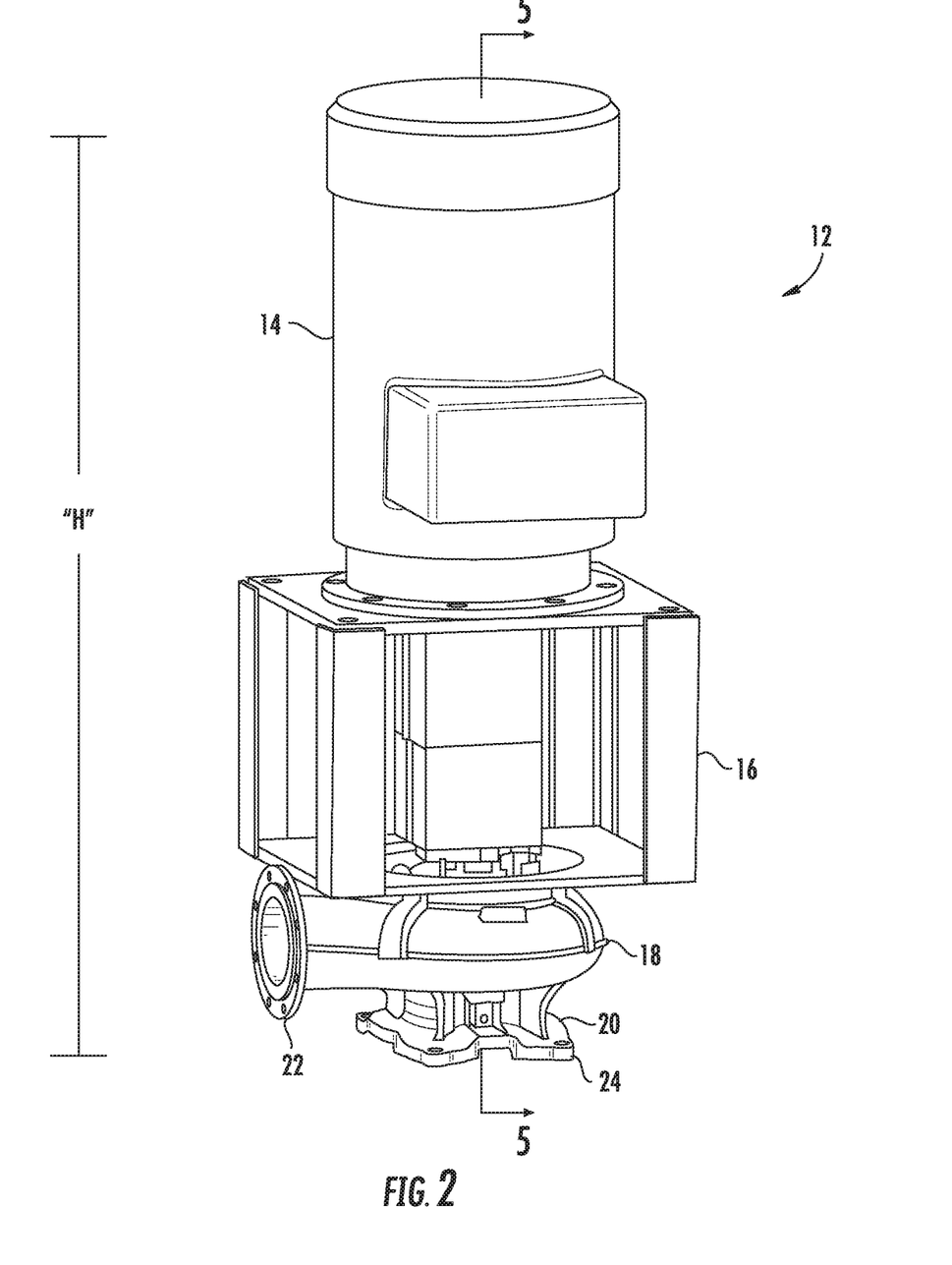
FIG. 2 is an isometric view of an exemplary centrifugal pump having a pump casing with an integral mounting flange in accordance with the disclosure.

The present disclosure describes an improved support arrangement for vertically oriented centrifugal pumps. More specifically, the present disclosure describes a pump casing that has a support flange integrally formed as part of the suction flange of the pump casing. Referring to FIG. 2, a vertically oriented centrifugal pump 12 according to the present disclosure includes a motor 14, a motor support portion 16 and a casing 18. As shown, the motor 14 is coupled to the motor support portion 16 (often referred to as a "lantern"), and the motor support portion 16 is coupled to an upper surface of the casing 18. As will be understood, the motor 14 may have a motor shaft arranged to transmit rotational force to an impeller (not shown) disposed within the casing 18.

The casing 18 includes a suction flange 20 for connecting to suction piping (not shown) and a discharge flange 22 for connecting to discharge piping (not shown).

As will be described in greater detail below, the suction flange 20 also includes a support flange portion 24 for coupling directly to ship's structure such as the ship's foundation.

Due to the substantial height "H" of the motor 14, substantial moments will be exerted on the support flange portion 24 due to the cyclic yaw and roll movements of the ship in heavy seas. Thus, the support flange portion 24 should be designed to withstand such moments during use.

As can be seen, with prior designs (FIG. 1), the outer dimension of the bracket 4 (and motor support portion 16) must be relatively large to ensure that the bracket does not touch the pump casing 18. In the disclosed design (FIG. 2) the dimension of the motor support portion 16 depends only on the motor size, and thus may be smaller than prior designs. An additional advantage of the disclosed design is that the piping forces are applied through the pump casing 18 only, whereas with prior designs piping forces are applied through the bracket 4, motor mount support 6, and pump casing 2.

Figure 3:
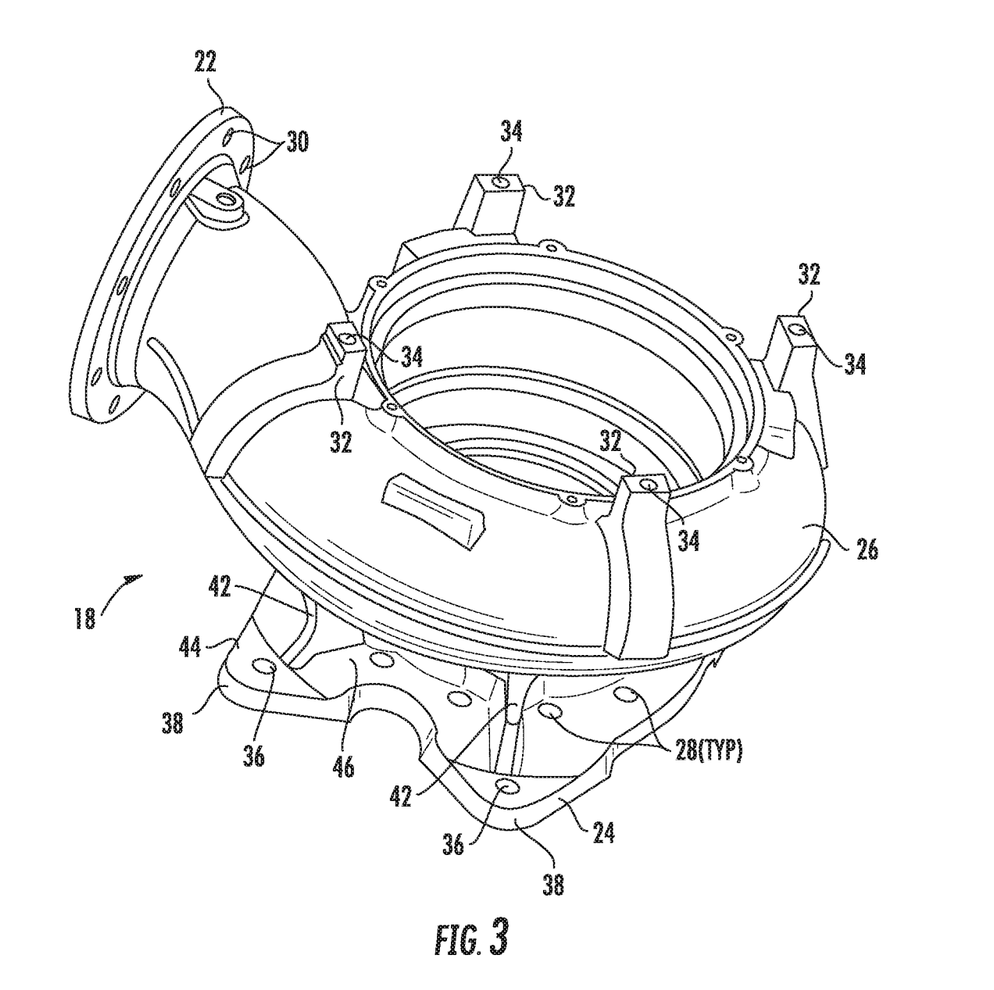
FIG. 3 is an isometric view of an exemplary pump casing with an integral mounting flange in accordance with the disclosure.
Figure 4:
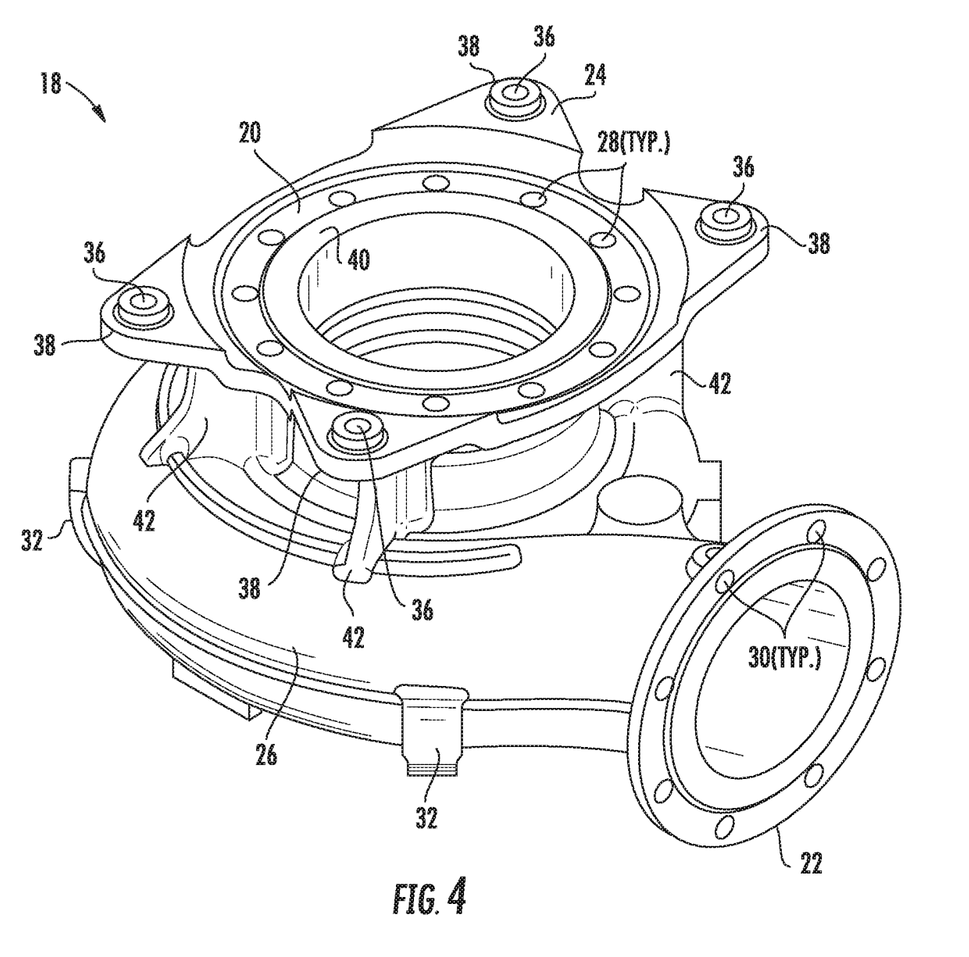
FIG. 4 is a reverse isometric view of the exemplary pump casing of FIG. 3.

Referring to FIGS. 3 and 4, the disclosed pump casing 18 will be described in greater detail. The pump casing 18 is shown with the motor, impeller and other components removed. As can be seen, the pump casing 18 includes a casing portion 26 that receives the impeller (not shown), as well as a suction flange 20 and a discharge flange 22. The suction and discharge flanges 20, 22 each have a plurality of fastener holes 28, 30 for coupling the flanges to associated suction and discharge piping (not shown).

A plurality of motor mounting reinforcements 32 may be disposed on an upper surface of the casing portion 26. These motor mounting reinforcements 32 may each comprise a pad formed or joined to an exterior surface of the casing portion 26. Each of the motor mounting reinforcements may have an vertically-oriented fastener recess 34 for receiving a fastener (not shown) to couple the motor 14 to the casing 18. In the illustrated embodiment, the motor mounting reinforcements 32 are equally spaced about the circumference of the casing portion 26.

As can be seen, the support flange portion 24 is formed as an integral extension of the suction flange 20. In the illustrated embodiment, the support flange portion 24 is a radial extension of the suction flange in that it is located radially outward with respect to the suction flange. The support flange portion 24 includes a plurality of fastener openings 36 for receiving fasteners (not shown) to couple the support flange portion to ship's structure such as the ship's foundation.

The support flange portion 24 may have a generally rectangular shape with the fastener openings 36 positioned at respective corners 38 thereof. As such, the fastener openings 36 are positioned radially outwardly of the fastener openings 28 of the suction flange 20. It will be appreciated that the illustrated shape is merely exemplary, and other shapes (e.g., round) could also be used without departing from the disclosure.

Figure 5:
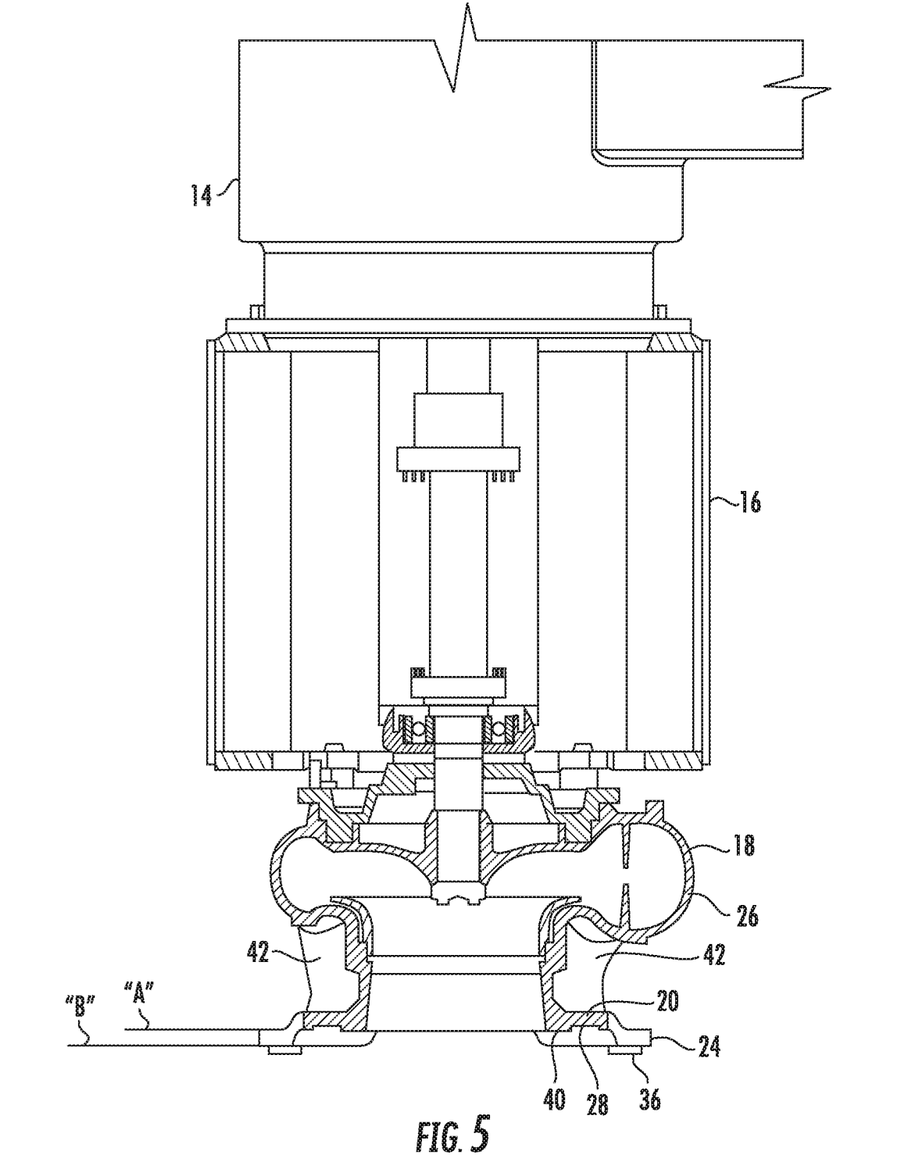
FIG. 5 is a cross-section view taken along line 5-5 of FIG. 2.
Figure 6:
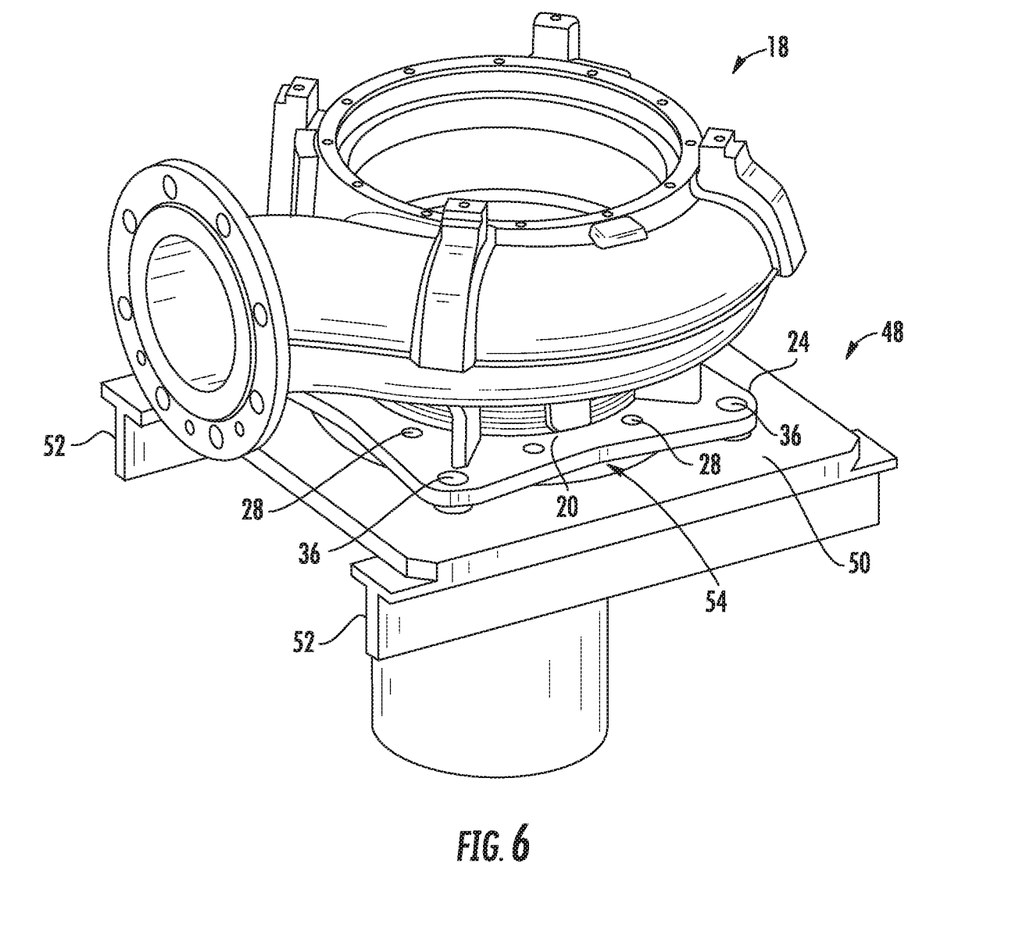
FIG. 6 is an isometric view of the exemplary pump casing of FIG. 3 coupled to a suction pipe and mounted to a first example support structure.
Figure 7:
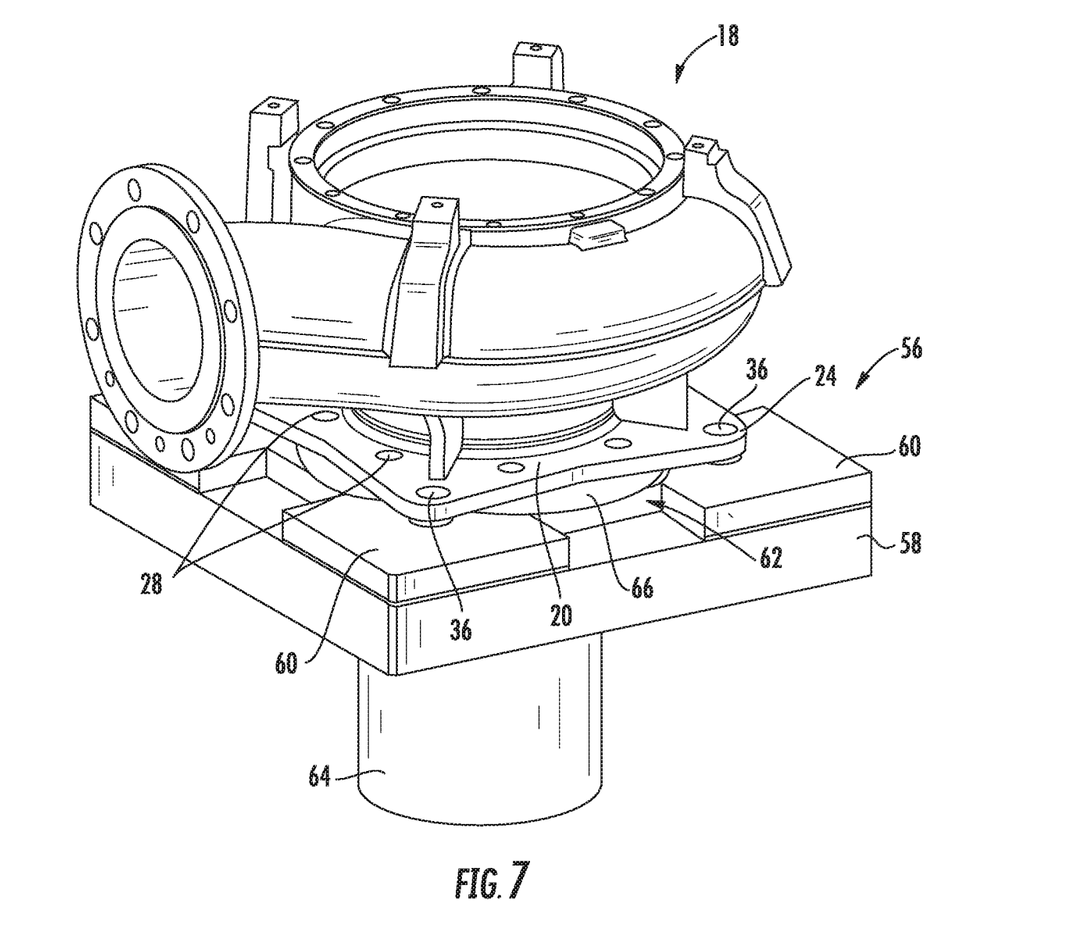
FIG. 7 is an isometric view of the exemplary pump casing of FIG. 3 coupled to a suction pipe and mounted to a second example support structure.

The suction flange 20 can have a seal-engaging surface 40 for engaging and sealing against a piping system seal (not shown) such as a gasket. As can best be seen in FIGS. 4 and 5, the seal-engaging surface 40 is recessed with respect to a bottom surface of the support flange portion 24. That is, a plane "A" formed by the seal-engaging surface is offset from a plane "B" formed by the bottom surface of the support flange portion 24. The benefit of providing such an offset is that it provides additional space between the fastener opening 36 and the casing 26. In some instances, the user may want to have the option of fixing the pump to the ship's structuring using hex head bolts (not shown) fixed to the pad portions 50, 60 (FIGS. 6, 7). These pad portions 50, 60 are often welded to the ship structure 52, 58 and may include threaded holes 70 to receive the hex bolts. The hex head bolts typically have a defined length, and thus if the distance between the fastener opening 36 and the casing 26 is shorter than the bolt length, it is not possible to introduce the bolt into the fastener opening. By providing the illustrated offset it is possible to place the majority of the suction flange 20 closer to the casing 26; while only extending the support flange portion 24 away from the casing to accommodate the hex bolts.

As best seen in FIG. 3, the pump casing 18 may include a plurality of stiffening ribs 42 that couple an upper surface 44 of the support flange portion 24 to the casing portion 26. In the illustrated embodiment, the plurality of stiffening ribs 42 also couple an upper surface 46 of the suction flange 20 to the casing portion 26. Each of the stiffening ribs 42 may be aligned with respective ones of the fastener openings 36 disposed in the support flange portion 24 (i.e., a radial extension of each stiffening rib passes through a center of the respective fastener hole). As will be appreciated, the stiffing ribs can provide a substantial increase in the stiffness of the casing. This can be an advantage because the pump casing 18 must absorb high piping forces caused by piping misalignments, thermal expansion of piping and/or movement of ship structure in heavy seas. Deformation of the pump casing due to such forces could, in the worst case, cause the rotating impeller to touch the inner surface of the casing, resulting in high wear.

Referring now to FIG. 6, the pump casing 18 is shown coupled to an exemplary structural support (foundation) 48. The structural support 48 comprises a pad portion 50 supported by a pair of support rails 52. Although not shown, the support rails 52 can be connected to additional supporting structure to provide a desired support to the casing 18 and other elements of the pump 12.

The pad portion 50 may include a central opening 54 though which a suction pipe segment 56 and associated flange (not shown) can couple to the suction flange 20 via fasteners disposed through the plurality of fastener openings 28. The pad portion 50 may also include a plurality of fastener openings (not shown) that correspond to the plurality of fastener openings 36 of the support flange portion 24 so that the support flange portion can be coupled to the pad portion 50 via a plurality of fasteners disposed through the plurality of fastener openings 36.

Figure 8:
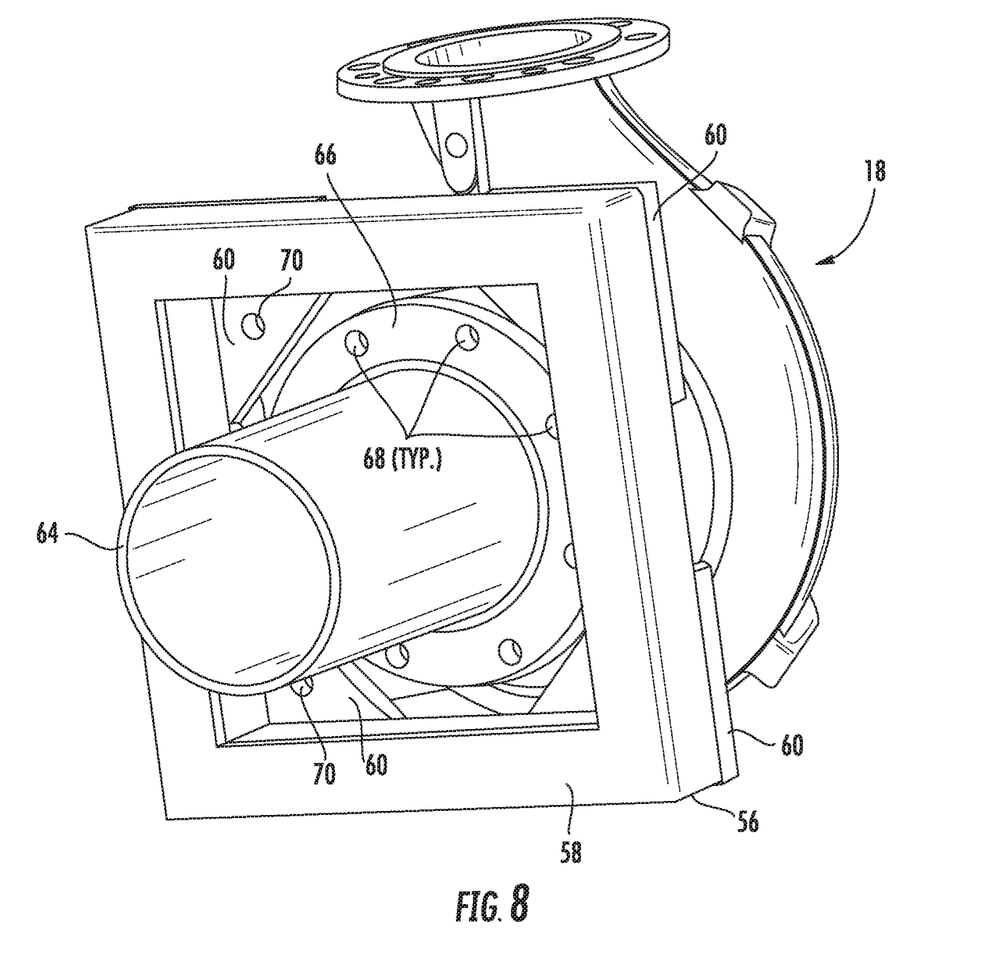
FIG. 8 is a reverse isometric view of the exemplary pump casing of FIG. 3 coupled to a suction pipe and mounted to the second example support structure.

FIGS. 7 and 8 show the pump casing 18 coupled to an alternative structural support (foundation) 56 which comprises a box-frame section 58 with a plurality of pad portions 60 disposed thereon. Although not shown, the box-frame section 58 can be connected to additional supporting structure to provide a desired support to the casing 18 and other elements of the pump 12.

Each of the plurality of pad portions 60 can be disposed at a respective corner of the box-frame pad portion 50 to form a central opening 62 though which a suction pipe segment 64 and associated flange 66 can couple to the suction flange 20 via fasteners disposed through the plurality of fastener openings 28 and fastener openings 68 of the piping flange 66. Each of the plurality of pad portions 60 may also include a plurality of fastener openings 70 that correspond to the plurality of fastener openings 36 of the support flange portion 24 so that the support flange portion can be coupled to the pad portions 60 via a plurality of fasteners disposed through the plurality of fastener openings 36, 70.

The support arrangements shown in FIGS. 6-8 illustrate just two examples how two install the pump 1, and others may be used. For example, the foundations (support rails 52 or box frame structure 58) are typically structural parts of the ship, and are therefore designed by the shipyard that is building the ship. Some shipyards prefer receiving the pad portions 50, 60 together with the pump 1, while other shipyards make the pad portions 50, 60 themselves. The foundation of FIGS. 7 and 8 needs four pad portions 60, while the foundation of FIG. 6, which includes only two parallel support rails 52, needs only a plate as pad portion 50.

As used herein, references to "one embodiment" of the present disclosure are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as examples of particular embodiments. Those skilled in the art will envision other modifications within the scope and spirit of the claims appended hereto.

The invention claimed is:

1. A pump casing with an integral support flange, the pump casing comprising:
   a casing portion for receiving an impeller therein;
   a suction flange for coupling the casing portion to suction piping of an associated piping system;
   a support flange portion for coupling the pump casing to a foundation to fix and support the pump casing during operation, wherein the support flange portion extends radially outwardly from and surrounds the suction flange; and
   a plurality of stiffening ribs coupling an upper surface of the support flange portion to the casing portion, wherein the plurality of stiffening ribs are positioned between adjacent ones of the plurality of fastener openings in the suction flange such that a radial extension of each stiffening rib passes through a center of respective fastener opening.

2. The pump casing of claim 1, wherein the suction flange and the support flange portion are cast along with the casing portion as a single piece.

3. The pump casing of claim 1, wherein the suction flange includes a plurality of fastener openings to receive a plurality of fasteners for fixing the pump casing to a flange of the associated piping system.

4. The pump casing of claim 3, wherein the support flange portion includes a plurality of fastener openings to receive a plurality of fasteners for fixing the pump casing to the foundation.

5. The pump casing of claim 4, wherein the plurality of fastener openings in the support flange portion are positioned radially outward of the plurality of fastener openings in the suction flange.

6. The pump casing of claim 4, wherein the support flange portion has a rectangular outer geometry, and wherein respective ones of the plurality of fastener openings in the support flange portion are positioned at respective corners of the support flange portion.

7. The pump casing of claim 1, wherein the support flange portion comprises a radial extension of the suction flange.

8. The pump casing of claim 1, wherein the plurality of stiffening ribs also couple an upper surface of the suction flange to the casing portion.

9. The pump casing of claim 1, wherein respective ones of the plurality of stiffening ribs are positioned directly adjacent to associated ones of the plurality of fastener openings in the support flange portion.

10. The pump casing of claim 1, wherein the plurality of fastener openings in the support flange portion are evenly spaced about a perimeter of the support flange portion.

11. The pump casing of claim 1, wherein a bottom surface of the support flange portion forms a plane that is offset from a plane formed by a seal-engaging surface of the suction flange.

12. The pump casing of claim 1, wherein the support flange portion is integral to the suction flange.

13. The pump casing of claim 1, wherein the casing portion has a plurality of motor mounting reinforcements each having a fastener recess for receiving a fastener to couple the casing portion to a motor.

14. The pump casing of claim 1, wherein the support flange portion is located radially outwardly with respect to the suction flange.

15. The pump casing of claim 1, wherein the support flange overcomes moment exerted by the motor and prevents forces from the suction piping from being applied to structures other than the pump casing.

16. The pump casing of claim 1, wherein the support flange portion is formed as a radial extension of the suction flange.

17. The pump casing of claim 1, wherein the distance between the casing portion and the support flange is sufficient to permit a bolt to be introduced into a fastener opening in the support flange along a side of the support flange facing the casing portion.

* * * * *